United States Patent
Stevenson et al.

(10) Patent No.: US 9,119,354 B2
(45) Date of Patent: Sep. 1, 2015

(54) TREE HARVESTER HEAD WITH LUBRICATION SYSTEM FOR MULTIPLE SAWS

(75) Inventors: Alex J. Stevenson, Papamoa (NZ); Boele De Vries, South Waikato (NZ)

(73) Assignee: DEERE & COMPANY, Moline, IL (US)

( * ) Notice: Subject to any disclaimer, the term of this patent is extended or adjusted under 35 U.S.C. 154(b) by 765 days.

(21) Appl. No.: 12/677,571

(22) PCT Filed: Sep. 11, 2007

(86) PCT No.: PCT/US2007/019730
§ 371 (c)(1),
(2), (4) Date: May 19, 2010

(87) PCT Pub. No.: WO2009/035434
PCT Pub. Date: Mar. 19, 2009

(65) Prior Publication Data
US 2010/0282367 A1    Nov. 11, 2010

(51) Int. Cl.
*A01G 23/08* (2006.01)
*A01G 23/091* (2006.01)

(52) U.S. Cl.
CPC .................. *A01G 23/091* (2013.01)

(58) Field of Classification Search
CPC .............................. A01G 23/091; F16N 25/00
USPC ............. 144/4.1, 34.1, 34.5; 83/425.2, 425.3, 83/803–808, 830–833
See application file for complete search history.

(56) References Cited

U.S. PATENT DOCUMENTS

| | | |
|---|---|---|
| 3,304,633 A | 2/1967 | Hein |
| 3,512,453 A | 5/1970 | Balzer |
| 3,726,326 A * | 4/1973 | Coleman ..................... 144/34.1 |
| 3,939,886 A | 2/1976 | Tucek |
| 4,005,625 A | 2/1977 | Brochu et al. |
| 4,016,956 A | 4/1977 | Karlsson |
| 4,077,445 A | 3/1978 | Wirt |
| 4,083,291 A | 4/1978 | Larsson |
| 4,226,270 A | 10/1980 | Sturtz, Jr. |
| 4,368,763 A | 1/1983 | Eaton |
| 4,537,236 A | 8/1985 | Kulju |
| 4,632,158 A | 12/1986 | Haeder |
| 4,735,049 A | 4/1988 | Ketonen |

(Continued)

FOREIGN PATENT DOCUMENTS

| | | |
|---|---|---|
| CA | 2384914 A1 | 11/2003 |
| FI | 89017 C | 5/1992 |

(Continued)

OTHER PUBLICATIONS

Bud Trinkel, (Sep. 2008), Hydraulics and Pneumatics Magazine, Fluid Power eBook, Chapter 8 directional control valves.*

(Continued)

*Primary Examiner* — Shelley Self
*Assistant Examiner* — Leonel Vasquez (57) ABSTRACT

A tree harvester head includes first and second saws, each of which comprises a cutting chain, and a lubrication system configured to lubricate the cutting chains of the first and second saws. The lubrication system comprises a source of pressurized lubricant and a diverter valve configured to divert flow of pressurized lubricant, from the source of pressurized lubricant, between the first and second saws for lubrication of the respective cutting chains.

13 Claims, 6 Drawing Sheets

(56) References Cited

U.S. PATENT DOCUMENTS

| | | | |
|---|---|---|---|
| 4,769,978 A * | 9/1988 | Reichen et al. | 56/12.3 |
| 5,056,224 A | 10/1991 | Seigneur | |
| 5,322,103 A * | 6/1994 | Hudson | 144/24.13 |
| 5,533,555 A | 7/1996 | Hudson | |
| 5,588,474 A | 12/1996 | Egging | |
| 5,699,712 A * | 12/1997 | Hudson | 83/795 |
| 5,851,963 A * | 12/1998 | O'Bryant | 508/216 |
| 6,035,909 A | 3/2000 | Holmes | |
| 6,082,420 A | 7/2000 | Milner | |
| 6,125,895 A | 10/2000 | Camirand | |
| 6,186,198 B1 | 2/2001 | Holmes | |
| 6,267,163 B1 | 7/2001 | Holmes | |
| 6,363,981 B1 | 4/2002 | Butler et al. | |
| 6,374,877 B1 | 4/2002 | Wildey | |
| 6,968,877 B1 | 11/2005 | Stokkeland | |
| 6,986,368 B2 | 1/2006 | Brown | |
| 7,017,631 B2 | 3/2006 | Fenton et al. | |
| 2003/0010196 A1 | 1/2003 | Smith et al. | |
| 2003/0140751 A1 | 7/2003 | McGehee | |
| 2004/0031463 A1 | 2/2004 | Williams et al. | |
| 2004/0191081 A1 * | 9/2004 | Schmidt | 417/307 |
| 2006/0096664 A1 | 5/2006 | Dubbs et al. | |
| 2006/0278305 A1 | 12/2006 | Barlow et al. | |

FOREIGN PATENT DOCUMENTS

| | | |
|---|---|---|
| FI | 7177 | 7/2006 |
| WO | 8702545 A1 | 5/1987 |
| WO | 9007870 A1 | 7/1990 |
| WO | 9323218 A1 | 11/1993 |
| WO | 9853666 A1 | 12/1998 |
| WO | 2008141411 A1 | 11/2008 |

OTHER PUBLICATIONS

Operation and Maintenance Manual (Feb. 2003), Caterpillar, SEBU7626-01, pp. 103-109.*

Notification Concerning Transmittal of International Preliminary Report on Patentability and the International Preliminary Report on Patentability (6 pages) (Mar. 25, 2010).

Notification of Transmittal of the International Search Report and the Written Opinion of the International Searching Authority, or the Declaration; the International Search Report, and the Written Opinion of the International Searching Authority (8 pages) (May 1, 2008).

Background Information (1 page)(admitted to be prior art before Sep. 11, 2007).

Forestry Commission Biodegradable Lubricants Article (2 pages)(admitted to be prior art at least as of Sep. 10, 2007).

* cited by examiner

TREE HARVESTER HEAD WITH LUBRICATION SYSTEM FOR MULTIPLE SAWS

FIELD OF THE DISCLOSURE

The present disclosure relates to a tree harvester head. More particularly, the present disclosure relates to lubrication of the cutting chains of multiple saws of the tree harvester head.

BACKGROUND OF THE DISCLOSURE

Tree harvester heads are typically equipped with a main saw at the base of the head. The main saw is used for felling trees and cross-cutting the trees once they have been felled.

Some tree harvester heads are also equipped with a topping saw. This saw is typically fitted to the upper portion of the head and is used for value recovery of the trees.

Each of the saws has a cutting chain disposed about a guide bar of the saw. Such cutting chains are lubricated to facilitate their operation and prolong their useful life.

SUMMARY OF THE DISCLOSURE

According to the present disclosure, there is provided a tree harvester head comprising first and second saws, each of which comprises a cutting chain, and a lubrication system configured to lubricate the cutting chains of the first and second saws. The lubrication system comprises a source of pressurized lubricant and a diverter valve configured to divert flow of pressurized lubricant, from the source of pressurized lubricant, between the first and second saws for lubrication of the respective cutting chains. Such an arrangement is particularly useful with a tree harvester head in which the first saw is the main saw of the head for felling and cross-cutting a tree, and the second saw is a topping saw just for cross-cutting a tree. The diverter valve may be operated electrically or hydraulically. An associated method of operating the tree harvester head is disclosed.

The above and other features will become apparent from the following description and the attached drawings.

BRIEF DESCRIPTION OF THE DRAWINGS

The detailed description of the drawings refers to the accompanying figures in which.

DESCRIPTION OF THE DRAWINGS

Figure 1:
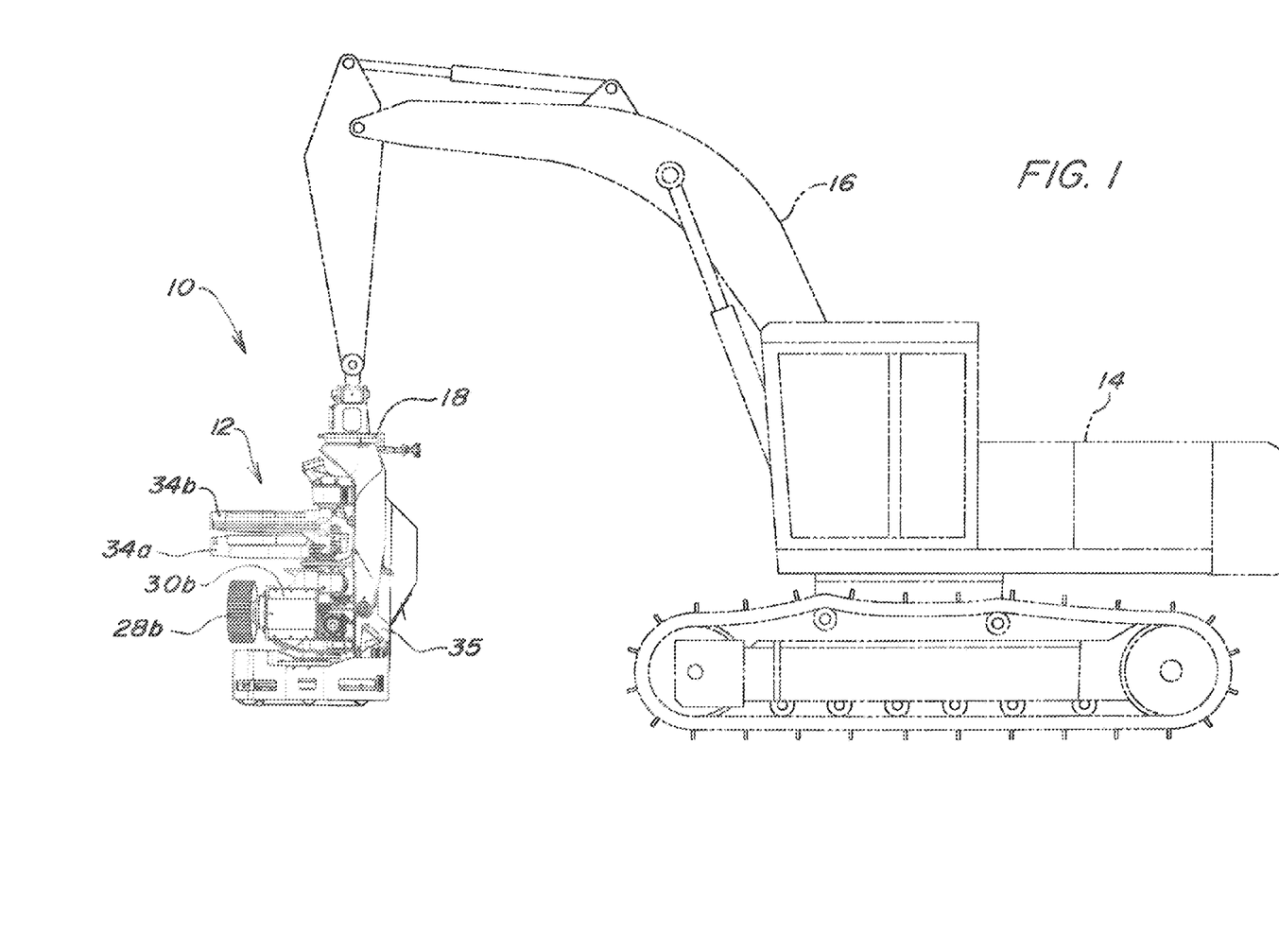
FIG. 1 is a side elevational view showing a forestry machine having a tree harvester head attached to a carrier via a boom assembly.

Referring to FIG. 1, an exemplary forestry machine 10 comprises a tree harvester head 12 attached to a carrier 14 via a boom assembly 16. It is to be understood that the tree harvester head 12 may be used with any suitable carrier 14 and boom assembly 16.

Figure 2:
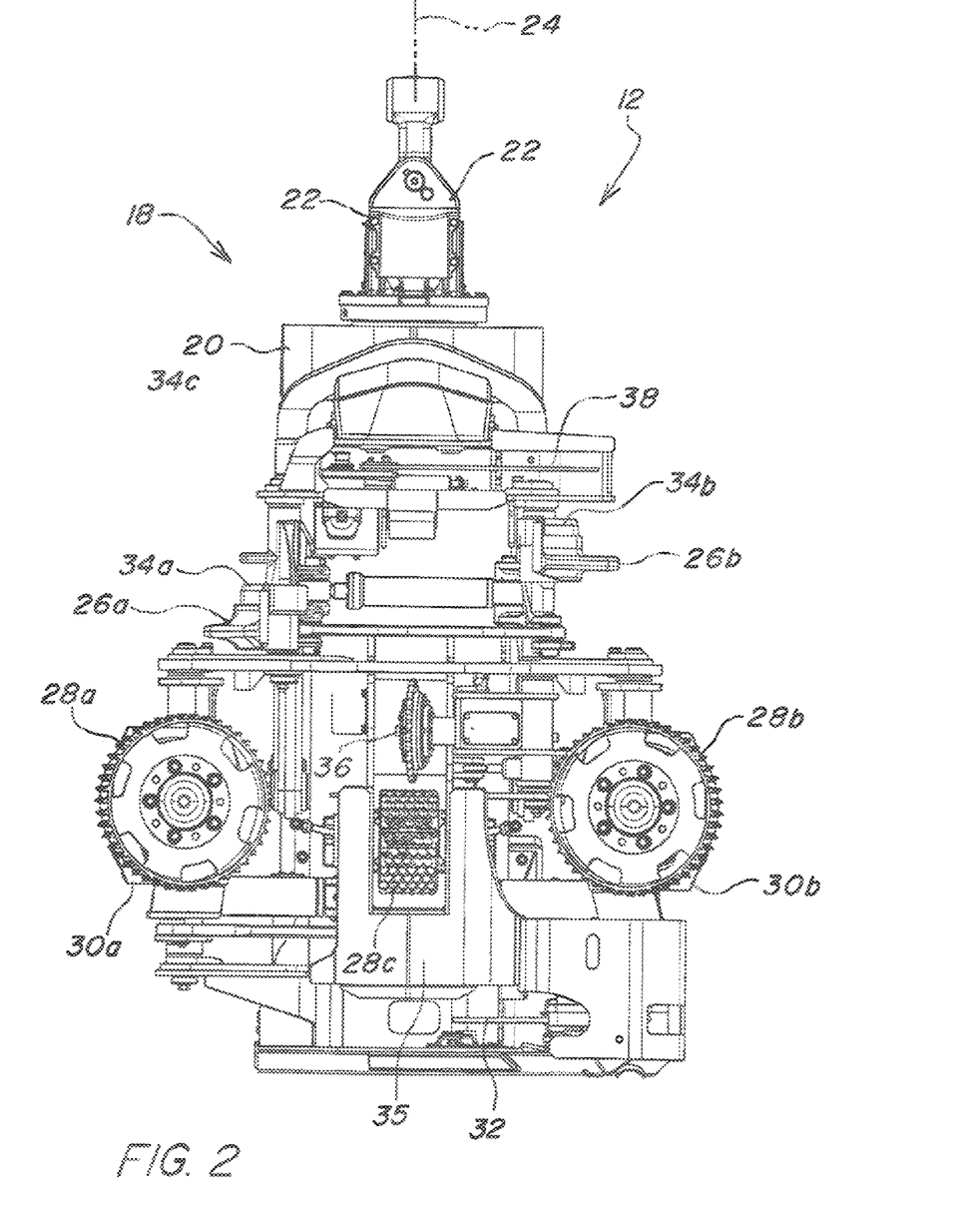
FIG. 2 is a front elevational view showing the tree harvester head in an upright, harvesting position and having a first, main saw near the bottom of the head and a second, topping saw near the top of the head.
Figure 3:
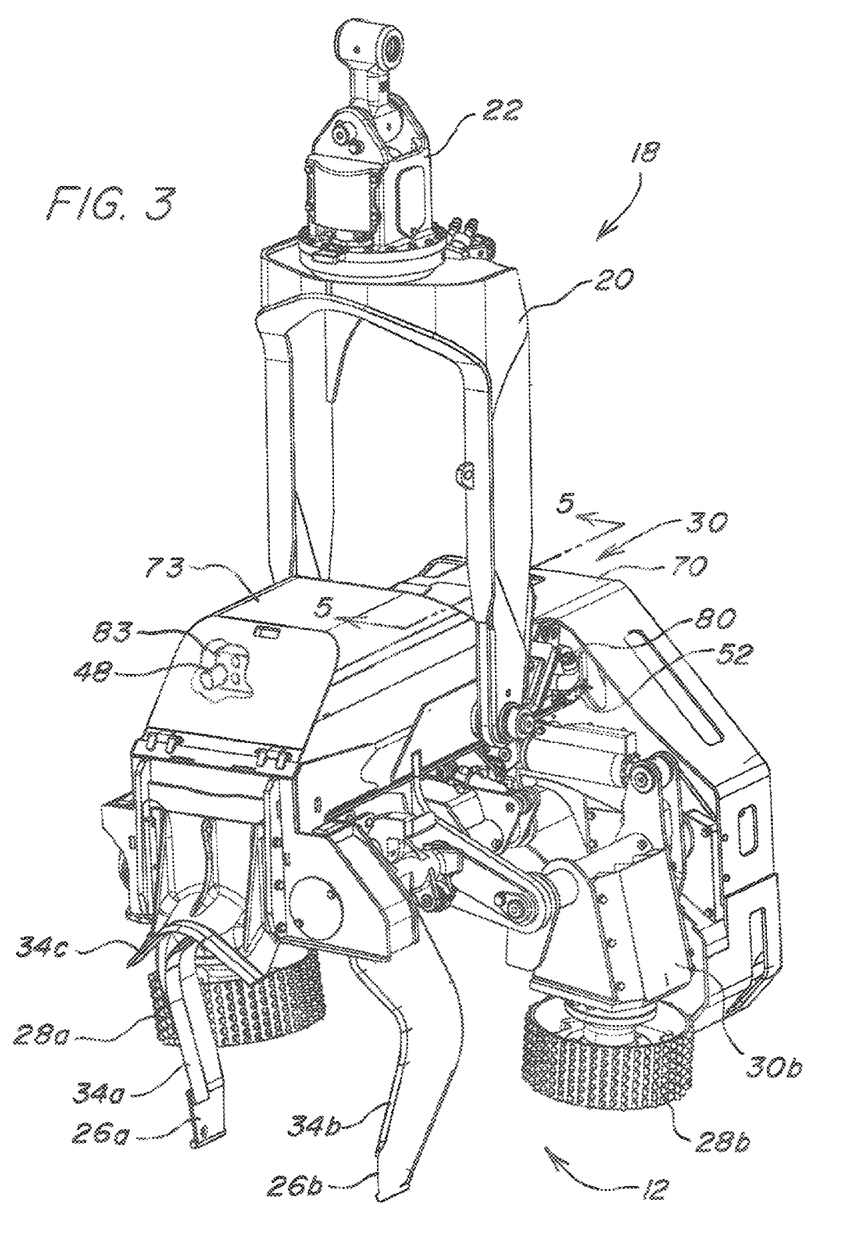
FIG. 3 is a perspective view showing the tree harvester head in a processing position.

Referring to FIGS. 2 and 3, the tree harvester head 12 is attachable to the boom assembly 16 via a hanger 18 for suspension from the boom assembly 16. Illustratively, the hanger 18 comprises a hanging bracket 20 to which the head 12 is pivotally attached and a rotator 22 for rotating the hanging bracket 20 and head 12 about an axis 24.

The head 12 is pivotal relative to the hanging bracket 20 between a generally upright, harvesting position for felling a tree (FIGS. 1 and 2) and a generally prone, processing position for processing a felled tree (FIG. 3). In the harvesting position, a number of gripping elements, such as, for example, grapple arms 26a, 26b and the drive wheels 28a, 28b of drive arms 30a, 30b, grip the unfelled tree, after which a main, first saw 32 is activated by the operator to fell the tree. The head 12 is then pivoted to its processing position so as to hold the felled tree in a generally horizontal position for processing, in which the drive wheels 28a, 28b, and 28c drive the felled tree back and forth as needed along knives 34a, 34b, formed on the grapple arms 26a, 26b, and a knife 34c, formed at an end of the chassis 35 of the head 12, to delimb the felled tree. The first saw 32 may then be used to cross-cut the tree into pieces of desired length measured by use of a length-measuring wheel 36 or other length-measuring device.

Exemplarily, the first saw 32 is mounted to the chassis 35 at a base thereof for pivotal movement relative thereto, while a topping, second saw 38 is mounted to the chassis 35 at the upper portion thereof for pivotal movement relative thereto. As such, the drive wheels 28a, 28b, 28c, drive arms 30a, 30b, knives 34a, 34b, and length-measuring device 36 are positioned between the saws 32, 38. While the first saw 32 may be used to cross-cut the tree held by the gripping elements of the head 12 at the base of the head 12, the second saw 38 may be used to cross-cut the tree at the upper portion of the head 12. It is to be understood that the second saw 38 may be mounted to the chassis 35 at a variety of locations other than at the upper portion thereof.

Figure 4:
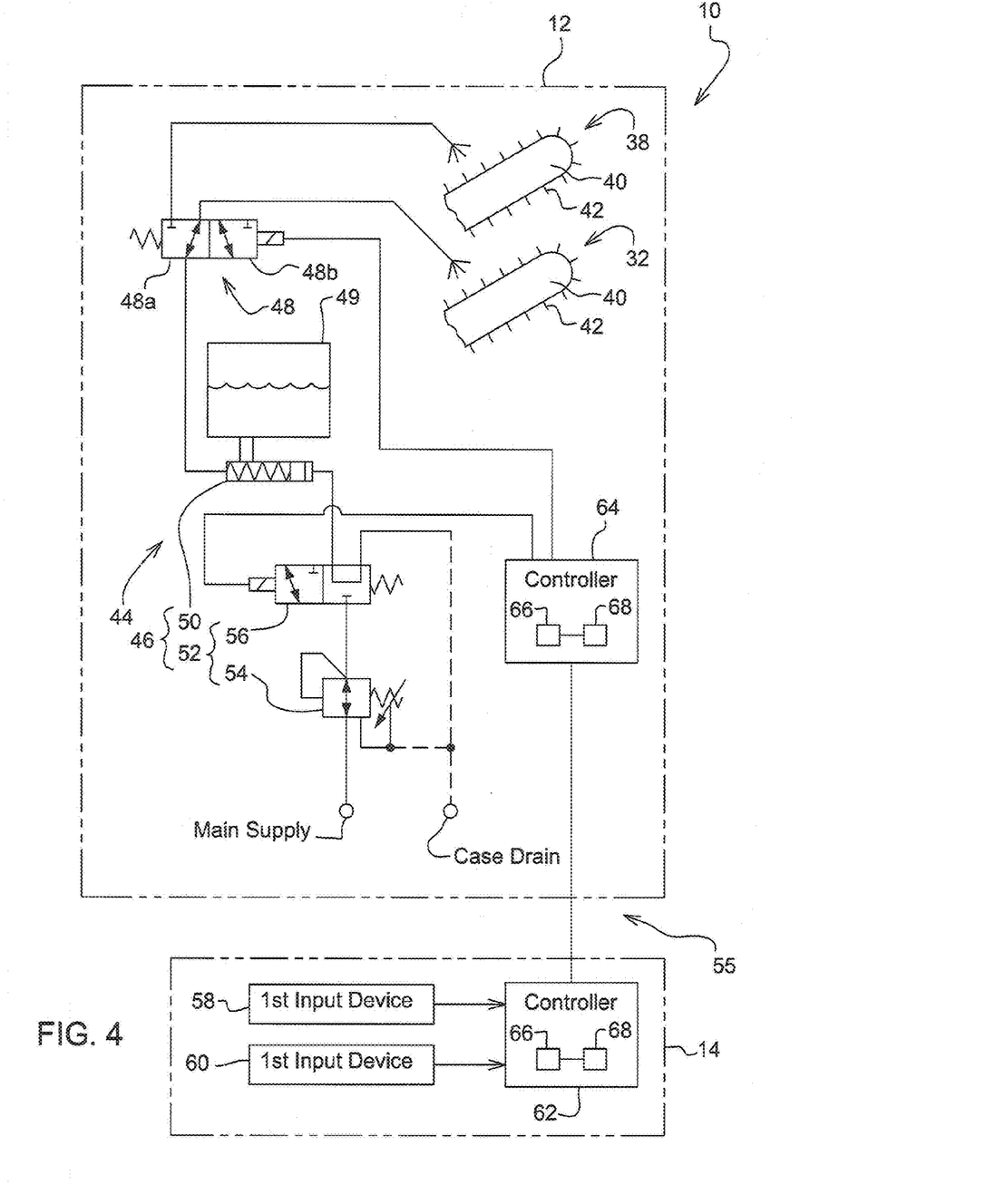
FIG. 4 is a simplified diagrammatic view showing a lubrication system for the cutting chains of the two saws of the tree harvester head, and electronic control of a diverter valve of the lubrication system.

Referring to FIG. 4, each saw 32, 38 is configured as a chain saw so as to have a guide bar 40 and a cutting chain 42 disposed about the guide bar 40 for movement along the periphery thereof upon activation of the respective saw 32, 38. A lubrication system 44 of the head 12 is configured to lubricate the cutting chains 42 of the first and second saws 32, 38.

The lubrication system 44 comprises a source of pressurized lubricant 46 and a diverter valve 48. The diverter valve 48 is configured to divert flow of pressurized lubricant, from the source of pressurized lubricant 46, between the first and second saws 32, 38 for lubrication of the respective cutting chains 42.

Exemplarily, the source of pressurized lubricant 46 comprises a lubricant reservoir 49, a pump 50, and a pump operator 52 configured to hydraulically operate the pump 50. Lubricant is gravity-fed from the reservoir 49 to the pump 50 configured, for example, as a plunger pump with a spring-biased piston mounted in a housing for reciprocating action. The pump 50 is positioned fluidly between the reservoir 49 and the diverter valve 48 and is configured to pump lubricant from the reservoir 49 through the diverter valve 48 to the first saw 32 or the second saw 38 as determined by the position of the diverter valve 48.

The pump operator 52 hydraulically operates the pump 50. Exemplarily, the pump operator 52 comprises a pressure-reducing valve 54, which reduces the pressure of the main supply of hydraulic fluid from the carrier 14 to a predetermined level (e.g., 90 bars), and a valve 56 electronically controlled by a control system 55. The valve 56 controls the flow of hydraulic fluid, reduced in pressure by the pressure-reducing valve 54, to the pump 50 in response to a control signal from the control system 55 (e.g., 300 ms ON and 400 ms OFF).

The diverter valve 48 is configured to divert flow of lubricant, pumped from the reservoir 49 by the pump 50, between the first and second saws 32, 38 for cutting-chain lubrication. The diverter valve 48 is electronically controlled by the control system 56, and has two positions: a first position 48a for diverting flow of lubricant to the first saw 32, and a second position 48b for diverting flow of lubricant to the second saw 38. Exemplarily, since only one saw 32, 38 will be operating at a time, in the first position, the diverter valve 48 not only diverts flow of pressurized lubricant to the first saw 32 but also blocks flow of pressurized lubricant to the second saw 38, and, in the second position, the diverter valve 48 not only diverts flow of pressurized lubricant to the second saw 38 but also blocks flow of pressurized lubricant to the first saw 32.

The diverter valve 48 is configured to assume its first position in the absence of an electronic control signal from the control system 56, and configured to assume its second position in response to the control signal. The diverter valve 48 is mechanically biased (e.g., spring-biased) to assume its first position in the absence of the control signal. Upon application of the control signal to the solenoid of the valve 48, the valve 48 shifts to its second position. As such, the diverter valve 48 normally diverts flow of lubricant to the first saw 32, which exemplarily is the main saw for felling and cross-cutting, since the first saw 32 will use most of the lubricant, as compared to the second saw 38, which is exemplarily the topping saw for only cross-cutting.

Each of the valves 48, 55 is electronically operated by the control system 55. First and second input devices 58, 60, in the form of, for example, control buttons located at the operator's station of the carrier 14, are operable by an operator to request activation of the first and second saws 32, 38, respectively.

In response to operation of the first input device 58, the control system 55 activates the first saw 32 and the lubrication system 44. In particular, the control system 55 outputs an electronic control signal to the operator valve 56 but does not output any control signal to the diverter valve 48. The control signal to the operator valve 56 pulses the valve 56 open and closed (e.g., 300 ms ON and 400 ms OFF) so as to hydraulically operate the pump 50, thereby pressurizing lubricant from the reservoir 49 (when OFF, the valve 56 directs flow to the case drain of the carrier 14). The control system 55, however, does not output a control signal to the diverter valve 48. As such, the diverter valve 48 remains in its first position so as to divert flow of lubricant, pumped from the reservoir 49 by the pump 50, to the first saw 32.

In response to operation of the second input device 60, the control system 55 activates the second saw 38 and the lubrication system 44. In particular, the control system 55 outputs an electronic control signal to the operator valve 56 and an electronic control signal to the diverter valve 48. The control signal to the operator valve 56 pulses the valve 56 open and closed (e.g., 300 ms ON and 400 ms OFF) so as to hydraulically operate the pump 50, thereby pressurizing lubricant from the reservoir 49 (when OFF, the valve 56 directs flow to the case drain of the carrier 14). The control signal to the diverter valve 48 energizes the solenoid thereof so that the diverter valve 48 assumes its second position so as to divert flow of pressurized lubricant to the second saw 38.

Exemplarily, the control system 55 comprises a network of electronic controllers (e.g., CAN), including, without limitation, a controller 62 onboard the carrier 14 and a controller 64 onboard the head 12. In this example, the controller 62 is configured to receive a request signal from each input device 58, 60, and send a message corresponding to that request to the controller 64. The controller 64 then outputs the corresponding control signal(s) to the valves 48, 56. Each controller 62, 64 has a processor 66 and a memory 68, the memory 68 having stored therein instructions which, when executed by the processor 66, cause the processor 66 to perform the various functions of the controller 62, 64.

Figure 5:
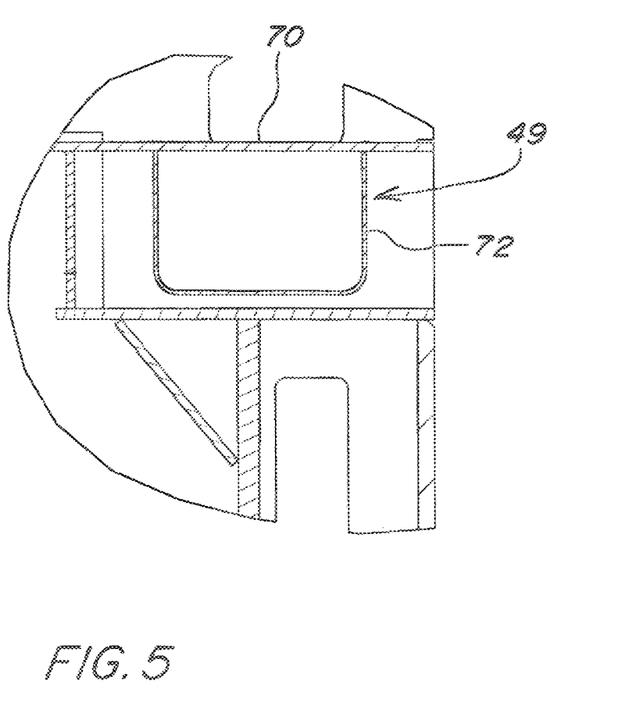
FIG. 5 is a sectional view taken along lines 5-5 of FIG. 3 showing a lubricant reservoir mounted to the chassis of the tree harvester head.

Referring to FIG. 5, there is shown a cross-section of the reservoir 49. In this example, the back 70 of the chassis 35 and a pan 72 cooperate to form the reservoir 49. In this way, the reservoir 49 is mounted to the chassis 35. A filler neck 80 (FIG. 3) attached to the reservoir 49 is accessible from the exterior of the head 12 to supply the reservoir 49 with lubricant.

Figure 6A:
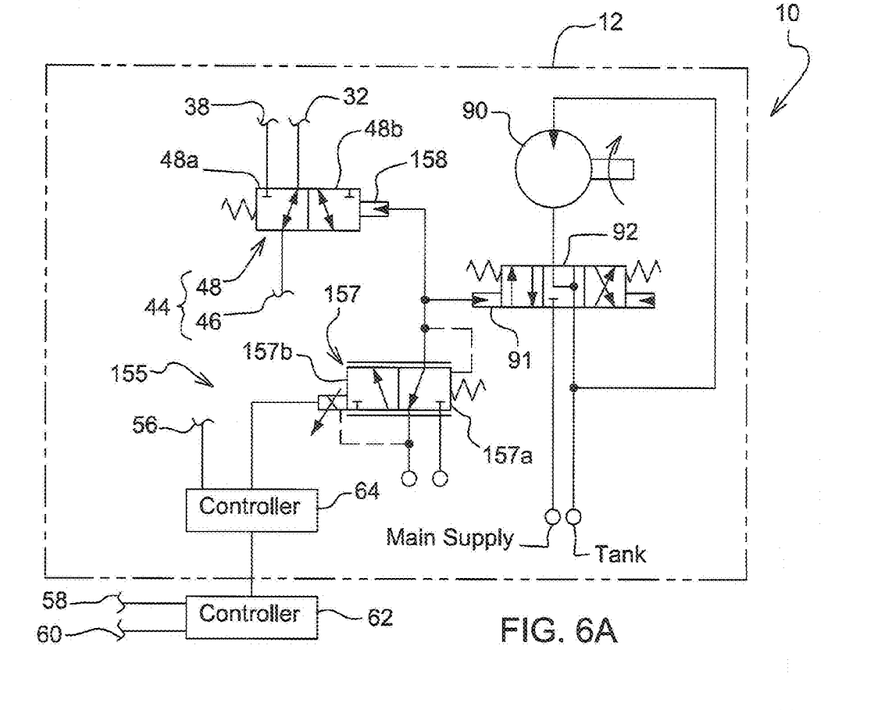
FIG. 6A is a simplified diagrammatic view showing hydraulic control of the diverter valve along with a saw motor associated with the second saw.
Figure 6B:
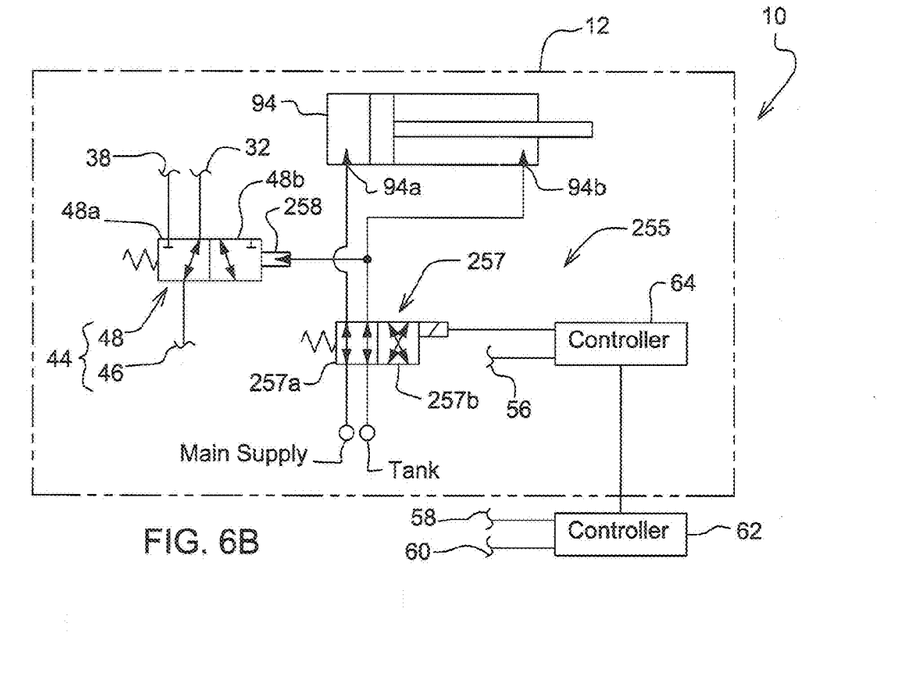
FIG. 6B is a simplified diagrammatic view showing hydraulic control of the diverter valve along with a bar cylinder associated with the second saw.

Referring to FIGS. 6A and 6B, the diverter valve 48 may be operated hydraulically. For example, in FIG. 6A, a control system 155 pilot-operates the diverter valve 48 upon activation of a saw motor 90 attached to the saw 38. The control system 155 comprises a control valve 157 under the control of the controller 64. The control valve 157 is, for example, a proportional valve movable between a first position 157a depressurizing the pilot port 158 of the diverter valve 48 and the pilot port 91 of a motor valve 92 fluidly coupled to the saw motor 90, and a second position 157b pressurizing those pilot ports 158, 91.

In response to operation of the first input device 58, the control system 155 activates the first saw 32 and the lubrication system 44. In particular, the control system 55 outputs the electronic control signal to the operator valve 56, so as to operate the valve 56 in the aforementioned manner, pressurizing lubricant from the reservoir 49. However, the control system 155 does not output an electronic control signal to the control valve 157 so that the control valve 157 remains in its first position. As such, the pilot ports 158, 91 are depressurized so that the diverter valve 48 remains in its first position diverting flow of lubricant, pumped from the reservoir 49 by the pump 50, to the first saw 32, and the saw motor 90 associated with the saw 38 remains inactive.

In response to operation of the second input device 60, the control system 155 activates the second saw 38 and the lubrication system 44. In particular, the control system 155 outputs an electronic control signal to the operator valve 56, so as to operate the valve 56 in the aforementioned manner, pressurizing lubricant from the reservoir 49, and outputs an electronic control signal to the control valve 157. The control signal to the control valve 157 energizes the solenoid thereof so that the control valve 157 assumes its second position. As such, the pilot ports 158, 91 are pressurized so that the diverter valve 48 assumes its second position diverting flow of lubricant, pumped from the reservoir 49 by the pump 50, to the second saw 38, and the saw motor 90 associated with the saw 38 is activated so as to activate the saw 38.

In FIG. 6B, a control system 255 pilot-operates the diverter valve 48 upon actuation of the guide bar 40 of the second saw 38 (i.e., upon pivotal movement of the guide bar 40 for cross-cutting).

The control system 255 comprises a control valve 257 under the control of the controller 64 for controlling movement of a bar cylinder 94 attached to the saw 38 to pivot the saw 38 between storage and cutting positions. Exemplarily, retraction of the cylinder 94 moves the saw 38 outside its housing to a cutting position, whereas extension of the cylinder 94 moves the saw 38 into its housing to a storage position. It is to be understood that the cylinder 94 may be plumbed in reverse for opposite movement of the saw 38.

The control valve 257 is configured to assume a first position 257a in the absence of an electronic control signal and a second position 257b upon application of an electronic control signal to its solenoid. In the first position 257a, the valve 257 is configured to direct flow of hydraulic fluid to a head port 94a of the bar cylinder 94. In the second position 257b, the valve 257 is configured to direct flow of hydraulic fluid to a rod port 94b of the bar cylinder 94. The diverter valve 48 has a pilot port 258 fluidly coupled to the rod port 94b so that, in the first position 257a of the control valve 257, the pilot port 258 is depressurized causing the diverter valve 48 to assume its first position 48a, and, in the second position of the control valve 257, the pilot port 258 is pressurized causing the diverter valve 48 to assume its second position 48b.

In response to operation of the first input device 58, the control system 255 activates the first saw 32 and the lubrication system 44. In particular, the control system 255 outputs an electronic control signal to the operator valve 56, so as to operate the valve 56 in the aforementioned manner, pressurizing lubricant from the reservoir 49. However, the control system 255 does not output an electronic control signal to the control valve 257 so that the control valve 257 remains in its first position. As such, the pilot port 258 of the diverter valve 48 is depressurized so that the diverter valve 48 remains in its first position diverting flow of lubricant, pumped from the reservoir 49 by the pump 50, to the first saw 32.

In response to operation of the second input device 60, the control system 255 activates the second saw 38 and the lubrication system 44. In particular, the control system 255 outputs an electronic control signal to the operator valve 56, so as to operate the valve 56 in the aforementioned manner, pressurizing lubricant from the reservoir 49, and outputs an electronic control signal to the control valve 257. The control signal to the control valve 257 energizes the solenoid thereof so that the control valve 257 assumes its second position. As such, the pilot port 258 of the diverter valve 48 is pressurized so that the diverter valve 48 assumes its second position diverting flow of lubricant, pumped from the reservoir 49 by the pump 50, to the second saw 38.

Referring back to FIG. 3, the valves 48, 55 may be included in a valve bank 82 of the head 12, as shown, for example, with respect to valve 48. Exemplarily, the valve bank 82 is mounted to the chassis 35, such as to the chassis back 70, and covered by a valve cover 73. It is to be understood that either or both of valves 48, 55 may be mounted to the chassis 35 separate from the main valve bank 82.

The lubrication system 44 has a number of benefits. For example, because of the diverter valve 48, it is able to employ a single source of pressurized lubricant for both saws 32, 38. As such, it has a single reservoir 49 and a single pump 50, in common with both saws 32, 38, promoting design and space efficiency.

Further, the lubrication system 44 employs a single type of lubricant. This lubricant is, for example, a lubricant, without hydraulic oil, that is more environmentally friendly than hydraulic oil and promotes the useful life of the cutting chains 42 and guide bars 40 more so than hydraulic oil. The lubricant may be a biodegradable chain lubrication oil, such as, for example, BP Bioforst 2000.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A tree harvester head, comprising:
   first and second saws, each of which comprises a cutting chain, and
   a lubrication system configured to lubricate the cutting chains of the first and second saws, the lubrication system comprising:
     a source of pressurized lubricant; and
     a diverter valve that comprises an inlet port fluidly coupled to the source of pressurized lubricant, a first outlet port fluidly coupled to the first saw, and a second outlet port fluidly coupled to the second saw, the diverter valve configured to divert flow of pressurized lubricant, from the source of pressurized lubricant, between the first and second outlet ports and thus the first and second saws for lubrication of the respective cutting chains, the diverter valve configured to assume a first position for diverting flow of pressurized lubricant to the first saw in the absence of a control signal, and a second position for diverting flow of pressurized lubricant to the second saw in response to the control signal,
   wherein the tree harvester head is included in a forestry machine comprising a first input device operable to request activation of the first saw, a second input device operable to request activation of the second saw, and a control system that controls the diverter valve and is configured to output the control signal to the diverter valve in response to operation of the second input device but not in response to operation of the first input device.

2. The tree harvester head of claim 1, wherein the first saw is configured to fell and cross-cut a tree, and the second saw is configured to cross-cut a felled tree held by the tree harvester head.

3. The tree harvester head of claim 1, wherein the source of pressurized lubricant comprises a lubricant reservoir, a pump positioned fluidly between the lubricant reservoir and the diverter valve, and a pump operator configured to operate the pump, and the control system is configured to output a control signal to the pump operator commanding operation of the pump in response to operation of each of the first input device and the second input device.

4. The tree harvester head of claim 1, comprising an electronic controller electrically coupled to the diverter valve.

5. The tree harvester head of claim 3, further comprising:
   a saw motor attached to the second saw, a motor valve fluidly coupled to the saw motor, a control valve, and an electronic controller electrically coupled to the control valve, the diverter valve comprises a pilot port, the motor valve comprises a pilot port, and the control valve is fluidly coupled to the pilot port of the diverter valve and the pilot port of the motor valve.

6. A tree harvester head, comprising:

first and second saws, each of which comprises a cutting chain, a lubrication system configured to lubricate the cutting chains of the first and second saws, the lubrication system comprising a source of pressurized lubricant and a diverter valve that comprises an inlet port fluidly coupled to the source of pressurized lubricant, a first outlet port fluidly coupled to the first saw, and a second outlet port fluidly coupled to the second saw and is configured to divert flow of pressurized lubricant, from the source of pressurized lubricant, between the first and second outlet ports and thus the first and second saws for lubrication of the respective cutting chains, wherein the diverter valve is configured to assume a first position for diverting flow of pressurized lubricant to the first saw in the absence of a control signal, and a second position for diverting flow of pressurized lubricant to the second saw in response to the control signal, a bar cylinder attached to a guide bar of the second saw, a control valve fluidly coupled to the bar cylinder and a pilot port of the diverter valve, and an electronic controller electrically coupled to the control valve.

7. The tree harvester head of claim 6, wherein the source of pressurized fluid comprises a lubricant reservoir and a pump positioned fluidly between the lubricant reservoir and the diverter valve.

8. The tree harvester head of claim 6, wherein the source of pressurized lubricant comprises a biodegradable lubricant, without hydraulic oil, for both saws.

9. A method of operating a tree harvester head, the tree harvester head comprising first and second saws, each of which comprises a cutting chain, and a diverter valve comprising a first outlet port associated with the first saw and a second outlet port associated with the second saw, the method comprising:

diverting flow of pressurized lubricant, from a source of pressurized lubricant of the tree harvester head, between the first and second outlet ports and thus the first and second saws for lubrication of the respective cutting chains, wherein the diverting comprises diverting flow of pressurized lubricant with the diverter valve by moving the diverter valve between a first position for diverting flow of pressurized lubricant to the first saw and a second position for diverting flow of pressurized lubricant to the second saw, the diverting comprises controlling the diverter valve such that the diverter valve assumes the first position in the absence of a control signal and assumes the second position in response to the control signal, the controlling comprises a control system outputting the control signal in response to operation of a second input device associated with the second saw but not in response to operation of a first input device associated with the first saw.

10. The method of claim 9, wherein the diverting comprises the control system outputting a control signal commanding operation of a pump, positioned fluidly between a lubricant reservoir and the diverter valve, in response to operation of each of the first input device and the second input device.

11. The method of claim 9, wherein the diverting comprises electronically operating the diverter valve.

12. The method of claim 9, wherein the diverting comprises hydraulically pilot-operating the diverter valve.

13. The tree harvester head of claim 1, wherein the first position is configured for diverting flow of pressurized lubricant from the first outlet port to the first saw and blocking flow of pressurized lubricant from the second outlet port to the second saw and the second position is configured for diverting flow of pressurized lubricant from the second outlet port to the second saw and blocking flow of pressurized lubricant from the first outlet port to the first saw.

* * * * *